(12) United States Patent
Schneider (10) Patent No.: US 7,895,347 B2
(45) Date of Patent: Feb. 22, 2011

(54) COMPACT ENCODING OF ARBITRARY LENGTH BINARY OBJECTS

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 416 days.

(21) Appl. No.: 11/881,527

(22) Filed: Jul. 27, 2007

(65) Prior Publication Data

US 2009/0028266 A1 Jan. 29, 2009

(51) Int. Cl.
*H04L 25/49* (2006.01)
(52) U.S. Cl. ................................ 709/230; 375/286
(58) Field of Classification Search ................ 709/230
See application file for complete search history.

(56) References Cited

U.S. PATENT DOCUMENTS 6,574,683 B1 * 6/2003 Comisky et al. .............. 710/23

| | | | |
|---|---|---|---|
| 2005/0180500 A1 * | 8/2005 | Chiang et al. | 375/240 |
| 2005/0226272 A1 * | 10/2005 | Luby et al. | 370/473 |
| 2006/0039398 A1 * | 2/2006 | Iwamura | 370/445 |
| 2007/0103344 A1 * | 5/2007 | Baumer | 341/50 |
| 2007/0147514 A1 * | 6/2007 | Yamaguchi et al. | 375/240.24 |

* cited by examiner

*Primary Examiner*—Wing F Chan
*Assistant Examiner*—Tesfay Yohannes
(74) *Attorney, Agent, or Firm*—Blakely, Sokoloff, Taylor & Zafman LLP (57) ABSTRACT

A method and apparatus for encoding data of arbitrary length. Data of arbitrary size is divided into one or more data blocks. One or more length blocks are generated that include length information identifying a quantity of the one or more data blocks into which the data is divided, wherein the length information can be determined by a number of reads of the length blocks and without examining the data blocks. The length blocks and the data blocks are transmitted.

20 Claims, 7 Drawing Sheets

Figure 1A

| Rule No. | Encoding |
|---|---|
| Rule 1A | 0yyyyyy |
| Rule 2A | 10xxyyyy |
| Rule 3A | 110xxxxx |
| Rule 4A | 1110xxxx |
| Rule 5A | 11110xxx |
| Rule 6A | 11111zzz |

Figure 1B

| Rule No. | Encoding |
|---|---|
| Rule 1B | 0yyyyyyyyyyyyyyy |
| Rule 2B | 10xxxxxyyyyyyyyy |
| Rule 3B | 110xxxxxxxxxxxxx |
| Rule 4B | 1110xxxxxxxxxxxx |
| Rule 5B | 11110xxxxxxxxxxx |
| Rule 6B | 11111zzzzzzzzzzz |

COMPACT ENCODING OF ARBITRARY LENGTH BINARY OBJECTS

TECHNICAL FIELD

Embodiments of the present invention relate to data encoding, and more specifically to data encoding rules that compactly encode arbitrary data of any size.

BACKGROUND

To efficiently transfer data between networked computing devices, data encoding schemes are often implemented. Two common encoding schemes used in the transmission of data between computing devices include Abstract Syntax Notation One (ASN-1) and 8 bit Unicode Transformation Format (UTF8).

ASN-1 provides a set of formal rules for describing the structure of objects that are independent of machine-specific encoding techniques. The combination of ASN-1 and specific ASN-1 encoding rules (e.g., basic encoding rules (BER), canonical encoding rules (CER), distinguished encoding rules (DER), etc.) facilitates the exchange of structured data between application programs over networks by describing data structures in a way that is independent of machine architecture and implementation language. Data encoded using ASN-1 is divided into multiple length bytes (octets) and data bytes. However, in ASN-1 every length byte must be read to determine how many length bytes and how many data bytes data has been encoded into. Furthermore, in at least some cases an entire coded entity (all data blocks and length blocks) need to be read to determine the number of data bytes when using ASN-1. Therefore, many reads of a data stream may be required before a length can be determined. Moreover, the smallest size for any encoding using ASN-1 is three bytes, and the largest size is $2^{1008}$ bytes. As used herein, the caret, "^", represents an exponential. For example, $2^4$ is equal to 16.

UTF8 is a set of encoding rules able to represent any character in the Unicode standard. UTF8 provides good byte-stream encoding of multi-byte character sets. However, UTF8 can encode data of at most 31 bits.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for encoding data of arbitrary size. In one embodiment, data of arbitrary size is divided into one or more data blocks. The data blocks may have a predetermined size (e.g., 8 bits, 16 bits, etc.). One or more length blocks are generated that include length information identifying the quantity of the data blocks into which the data is divided. The one or more length blocks may have the predetermined size of the data blocks. The length information may be determined by a number of reads of the length blocks and without examining data blocks that do not include length information. Moreover, the number of length blocks may be determined without examining all of the length blocks. In one embodiment, the length information can be determined by at most three reads for non-recursive encodings. The data blocks and the length blocks may then be transmitted to a destination.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "generating", "performing", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

Figure 1A:
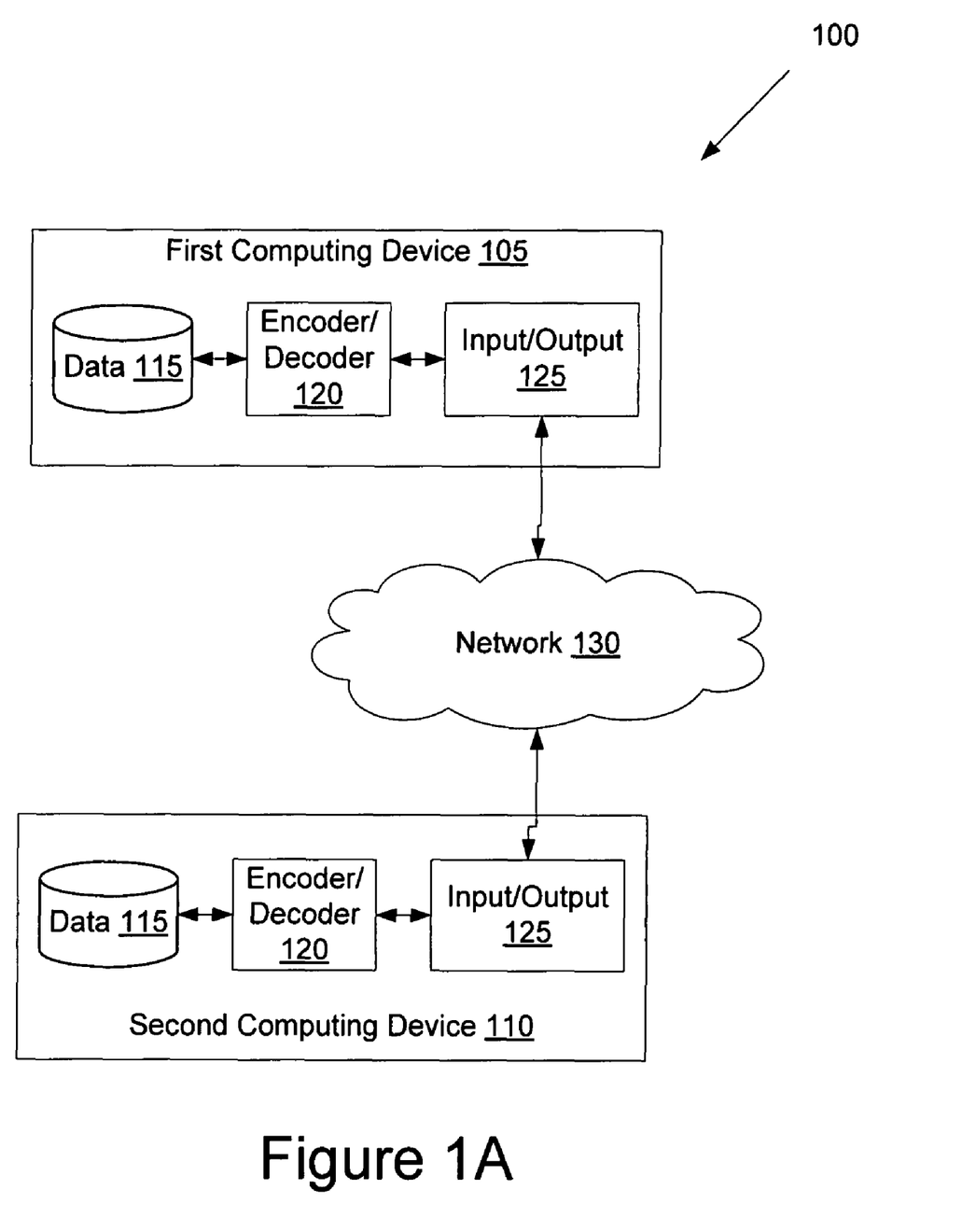
FIG. 1A illustrates an exemplary network architecture in which embodiments of the present invention may operate.

FIG. 1A illustrates an exemplary network architecture 100 in which embodiments of the present invention may operate. The network architecture 100 may include a first computing device 105 and a second computing device 110 connected via a network 130. The network may be a public network (e.g., the internet) or a private network (e.g., a local area network (LAN), intraweb, etc.).

Each of the first computing device 105 and second computing device 110 may be a desktop computer, notebook computer, cellular phone, personal digital assistant (PDA), or other device capable of processing machine-executable code. Moreover, the first computing device 105 and second computing device 110 may each operate as a client or server in a client-server environment, or as a peer in a peer-to-peer environment. In one embodiment, the first computing device 105 and second computing device 110 each include data 115, an encoder 120, and an input/output unit 125.

Data 115 may be data of arbitrary size, and may be stored in a storage medium such as a hard disk drive, random access memory (RAM), read only memory (ROM), optical media, magnetic media, etc. Encoder/decoder 120 may be connected with a storage medium that includes data 115. Encoder/decoder 120 may compactly encode data for transmission or storage, and decode received or read data. Encoded data may be transmitted and received using input/output 125, with which encoder/decoder 120 is connected.

Figure 1B:
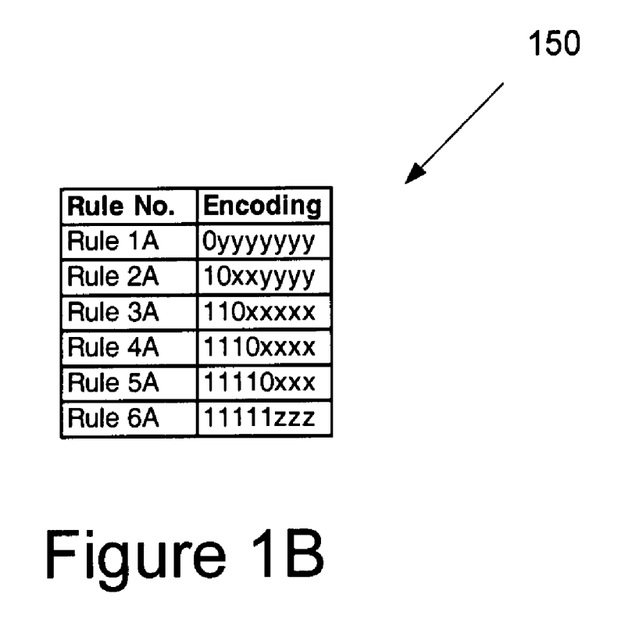
FIG. 1B illustrates a set of encoding rules, in accordance with one embodiment of the present invention.

FIG. 1B illustrates a set of exemplary encoding rules 150 that may be used to encode an unsigned integer of arbitrary size into a binary encoding, in accordance with one embodiment of the present invention. In further embodiments, the set of encoding rules 150 may be extended to encode signed integers, text strings, audio data, video data, or any arbitrary object or objects (e.g., an object that includes other objects). These encoding rules describe how data should be encoded (e.g., for transmission) regardless of machine, programming language, or how the data is represented in an application program, and may encode data without the use of delimiters. In one embodiment, the set of encoding rules 150 is implemented by encoder/decoder 120 of FIG. 1A.

The set of encoding rules 150 encodes arbitrarily sized data into a collection of 8 bit blocks or words (groups of bits having a fixed size that are handled together by an operating system). The set of encoding rules 150 may further be used to unambiguously decode data that has been encoded. An 8 bit block/word is hereinafter referred to as an octet. A block that includes length information is referred to herein as a length block, and a block that includes encoded data other than length information is referred to herein as a data block. A single block may be both a length block and a data block.

The set of encoding rules 150 may encode data into length blocks and data blocks such that the number of length blocks may be determined without examining all of the length blocks, and the number of data blocks and the total length (including the number of length blocks and the number of data blocks) may be determined without examining data blocks that do not include length information. Thereby, a total length of a sequence may be determined with a minimal effort. Moreover, a total length of the sequence may be determined by a recipient before any data blocks are received.

In one embodiment, the set of encoding rules 150 includes six rules (rules 1A through 6A), each of which may be used to operate on specific data. A selection of which encoding rules should be used to encode data may be dependent upon data contents and/or on user preferences. Though different rules may be used to encode the same data, some rules may be more efficient for encoding specific data than other rules. For example, rule 1A may encode data in a single octet, rule 2A may encode data into 2-5 octets, rule 3A may encode data into 6-36 octets, etc. In one embodiment, a most efficient rule (a rule that is able to encode data using the fewest number of octets) is automatically selected to encode data. For example, if rule 1A can encode a value using one octet, and rule 2A can encode the same value using three octets, then rule 1A would be used to encode the value. Alternatively, a less efficient rule may be used to encode data.

Referring to FIG. 1B, rule 1A is identified by the highest order bit in an octet having a value of zero. The remaining seven bits in the octet, represented as "y"s in FIG. 1B, may represent an unsigned integer having a value of 0 to 127. Data encoded using rule 1A is contained within a single octet, which includes both length information (the first bit) and content information (the remaining seven bits). For example, the decimal value of 15 may be represented by a single octet having the encoded value of 00001111 when encoded using rule 1A.

Rule 2A is identified by the two highest order bits in the first octet of a sequence of octets having the values of one and zero, respectively. The subsequent two bits in the first octet, represented as "x"s in FIG. 1B, may represent the number of following octets in the sequence that include content information. The number of following octets may be determined by adding one to the value encoded by the subsequent two bits. The remaining four bits in the first octet, represented as "y"s, may represent the four lowest order bits of the content information. The remaining content information is contained in the following one to four octets. Rule 2A can represent the values of 0 to $2^{36}-1$. For example, the decimal value of 273 may be represented by a sequence of two octets having the encoded values 10000001 00010001 when encoded using rule 2A. The first octet identifies that rule 2A is being used, that the data is represented by two octets, and that the four lowest order bits of the content information are 0001. The second octet includes the remaining bits of the content information used to represent the value 273.

Rule 3A is identified by the three highest order bits in the first octet of a sequence of octets having the values of one, one and zero, respectively. The subsequent five bits in the first octet, represented as "x"s, may represent the number of following octets that include content information in the sequence, which may range from five to thirty six octets. Rule 3A can represent the values of 0 to $2^{228}-1$. For example, the decimal value of 21,542,142,465 may be represented by a sequence of six octets having the encoded values 11000000 00000001 00000010 000000011 00000100 00000101 when encoded using rule 3A. The first octet in the sequence identifies that rule 3A has been used to encode the data, and that the following five octets include the content information. Rule 3A can encode values up to and including most symmetrical cryptographic keys.

For rules 1A through 3A, only a single read of a first octet of a sequence may be necessary to determine the length of the sequence. In each of rules 1A-3A, the first octet may identify the total length of the sequence (how many data blocks and how many length blocks), and the first octet and/or the subsequent octets in the sequence may include the content information.

Rule 4A is identified by the four highest order bits in the first octet of a sequence of octets having the values of one, one, one and zero, respectively. The four remaining bits in the first octet, represented as "x"s, may represent the number of subsequent octets in the sequence that include length information (the number of length blocks). The number of length blocks can be determined by adding one to the value represented by the four remaining bits in the first octet, and may therefore range from one to sixteen. The number of octets including content information can be as much as $2^{128}-1$, and the encoding can represent the values of 0 to $2^{2,722,258,935,367,507,707,706,996,859,454,145,691,640}-1$. For rule 4A, a first read of the first octet identifies how many subsequent octets are length blocks, and a second read of the length blocks identifies how many octets are in the sequence (e.g., the number of data blocks and/or the number of length blocks).

Rule 5A is identified by the five highest order bits in the first octet of a sequence of octets having the values of one, one, one, one and zero, respectively. The three remaining bits in the first octet, represented as "x"s, may represent three bits (e.g., the low order bits or high order bits) that along with the bits in a second octet in the sequence identify the number of subsequent octets in the sequence that are used to identify the number of length blocks. As many as 2048 octets may be used in the sequence to identify the number of length blocks. For rule 5A, a first read of the first octet identifies how many subsequent length blocks need to be read to determine a number of additional length blocks. A second read of the subsequent length blocks identifies how many additional length blocks are used to represent the length of the sequence, and a third read of the additional length blocks identifies the number of data blocks, and therefore the size of the sequence. Therefore, a total length of a sequence may be determined in three reads.

Rule 6A is identified by the five highest order bits in the first octet of a sequence of octets each having the value of one. The three remaining bits in the first octet, represented as "z"s in FIG. 1B, may not represent anything, and may be ignored. The subsequent octets in the sequence may use rules 1A-5A to identify an integer, and the integer may identify the number of octets that are used to represent an encoded value. Rule 6A may be used to represent data of any size.

In one embodiment, for each of rules 2A through 6A, the first data block in the sequence contains the least significant bits of the content information. Alternatively, the final data blocks in the sequence may include the least significant bits of the contact information.

In one embodiment, rules 1A through 6A may be extended to represent signed integers (integers that can be distinguished as having a negative or positive value) by representing the integers, for example, in two's complement form.

Using this extension, rule 1A could encode the values −64 to 63, rule 1B could encode the values $-2^{35}$ to $2^{35}-1$, and so on.

In another embodiment, rules 1A through 6A may be extended to represent any arbitrary objects. In such an embodiment, rule 1A could indicate a zero-length stream. Rule 2A would be modified such that no content information is represented in the first octet (the "yyyy" component of the first octet would be ignored). Rules 3A through 6A would operate as described above, and would not need modification.

Rules 1A through 6A may be used recursively in any combination. For example, the separate encodings of different objects may be wrapped together within another encoding. Rules 1A through 6A may therefore be used to encode an arbitrarily complex data structure into a self contained encoded sequence with low overhead. When rules 1A-6A are used recursively, more than three reads may be necessary to determine a length of an encoding.

The set of rules 150 described with reference to FIG. 1B are used to encode data into 8 bit blocks. However, the set of rules 150 may be modified to encode data into differently sized blocks. In one embodiment, the set of encoding rules 150 may be modified to encode data into blocks having a size of 5 bits or more. For example, the encoding rules may encode data into 5 bit blocks, 10 bit blocks, 16 bit blocks, 24 bit blocks, 32 bit blocks, etc.

The highest order bit of a block encoded using a modified rule 1A has a value of zero. The remaining bits in the block may represent content information. The two highest order bits in the first block of a sequence of blocks encoded using a modified rule 2A have the values of one and zero, respectively. The subsequent one third of the remaining bits (rounded up) determine a number of data blocks, and the final two thirds of the remaining bits (rounded down) include content information (or are ignored if non-integer data is being encoded).

The three highest order bits in the first block of a sequence of blocks encoded using a modified rule 3A have the values of one, one and zero, respectively. The remaining bits in the first block may represent the number of following blocks that include content information in the sequence. The four highest order bits in the first block of a sequence of blocks encoded using a modified rule 4A have the values of one, one, one and zero, respectively. The remaining bits in the first block may represent the number of subsequent length blocks in the sequence.

The five highest order bits in the first block of a sequence of blocks encoded using a modified rule 5A have the values of one, one, one, one and zero, respectively. The remaining bits in the first block may represent bits that along with the bits in a second block in the sequence identify the number of subsequent blocks in the sequence that are used to identify the number of length blocks. Rule 6A is unchanged regardless of the number of bits in a block. The five highest order bits in the first block in a sequence identify rule 6A, and the subsequent bits in the block are ignored.

Figure 1C:
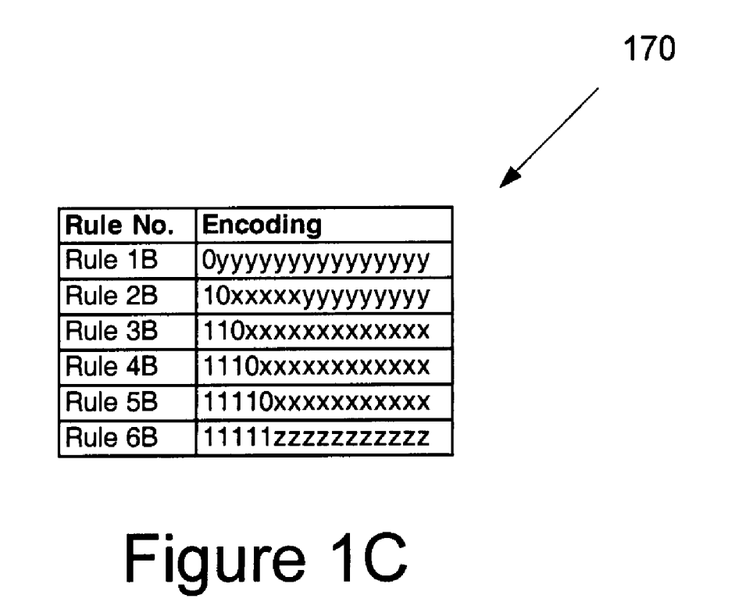
FIG. 1C illustrates a set of encoding rules, in accordance with another embodiment of the present invention.

FIG. 1C illustrates a set of exemplary encoding rules 170 that may be used to encode an unsigned integer of arbitrary size into a binary encoding, in accordance with another embodiment of the present invention. In further embodiments, the set of encoding rules 170 may be extended to encode signed integers, text strings, or any arbitrary object or objects, and may be used recursively. The set of encoding rules 170 illustrates how the set of encoding rules 150 of FIG. 1B may be modified to encode arbitrarily sized data into a collection of 16 bit blocks or words. The set of encoding rules 150 may equally be modified to encode data into differently sized blocks. In one embodiment, the set of encoding rules 170 is implemented by encoder/decoder 120 of FIG. 1A.

Referring to FIG. 1C, rule 1B is identified by the highest order bit in a 16 bit block having a value of zero. The remaining fifteen bits in the block, represented as "y"s in FIG. 1C, may represent an unsigned integer having a value of 0 to 32,767, or a signed integer having a value of −16384 to +16363.

Rule 2B is identified by the two highest order bits in the first 16 bit block of a sequence of 16 bit blocks having the values of one and zero, respectively. The subsequent five bits in the first block, represented as "x"s in FIG. 1C, may represent the number of following 16 bit blocks in the sequence that include content information. The remaining nine bits in the first block, represented as "y"s, may represent the lowest order bits of the content information. The remaining content information is contained in the following one to thirty two 16 bit blocks.

Rule 3B is identified by the three highest order bits in the first 16 bit block of a sequence of 16 bit blocks having the values of one, one and zero, respectively. The subsequent thirteen bits in the first block, represented as "x"s, may represent the number of following blocks that include content information in the sequence. The content information may be included in between 33 and 8,224 data blocks using rule 3B.

Rule 4B is identified by the four highest order bits in the first 16 bit block of a sequence of 16 bit blocks having the values of one, one, one and zero, respectively. The twelve remaining bits in the first block, represented as "x"s, may represent the number of subsequent 16 bit blocks in the sequence that include length information (the number of length blocks). Rule 4B allows for one to 4,096 length blocks and up to 2^65536 data blocks.

Rule 5B is identified by the five highest order bits in the first 16 bit block of a sequence of 16 bit blocks having the values of one, one, one, one and zero, respectively. The eleven remaining bits in the first block, represented as "x"s, may represent eleven bits that along with the bits in a second 16 bit block in the sequence identify the number of subsequent blocks in the sequence that are used to identify the number of length blocks. Rule 5B may allow for up to 2^27 length blocks and 2^(2^31) data blocks.

Rule 6B is identified by the five highest order bits in the first 16 bit block of a sequence of 16 bit blocks each having the value of one. The eleven remaining bits in the first block, represented as "z"s in FIG. 1C, may not represent anything, and may be ignored. The subsequent blocks in the sequence may use rules 1B-5B to identify a value, and the value may identify the number of blocks that are used to represent content information.

Figure 2A:
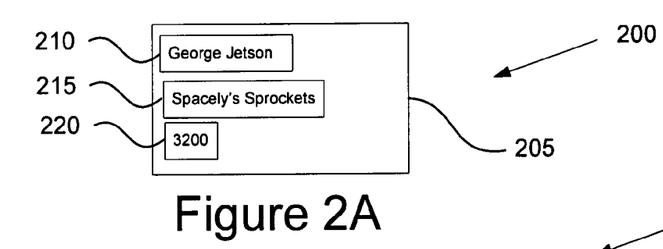
FIG. 2A illustrates a block diagram of data, in accordance with one embodiment of the present invention.

FIG. 2A illustrates an exemplary set of data 200, in accordance with one embodiment of the present invention. The set of data 200 may include a first object 205 that contains a first property 210, a second property 215 and a third property 220. As used herein, a property is an attribute of an object. In the illustrated embodiment, the first property 210 is a name property that includes the name "George Jetson," the second property 215 is an employer property that includes the name "Spacely's Sprockets," and the third property is a salary property that includes the value "3200." Alternatively, the set of data 200 could include a different object or collection of objects. For example, the set of data 200 could include a first object 205 that in turn contains three objects, representing the first property 210, second property 215 and third property 220, respectively.

Figure 2B:
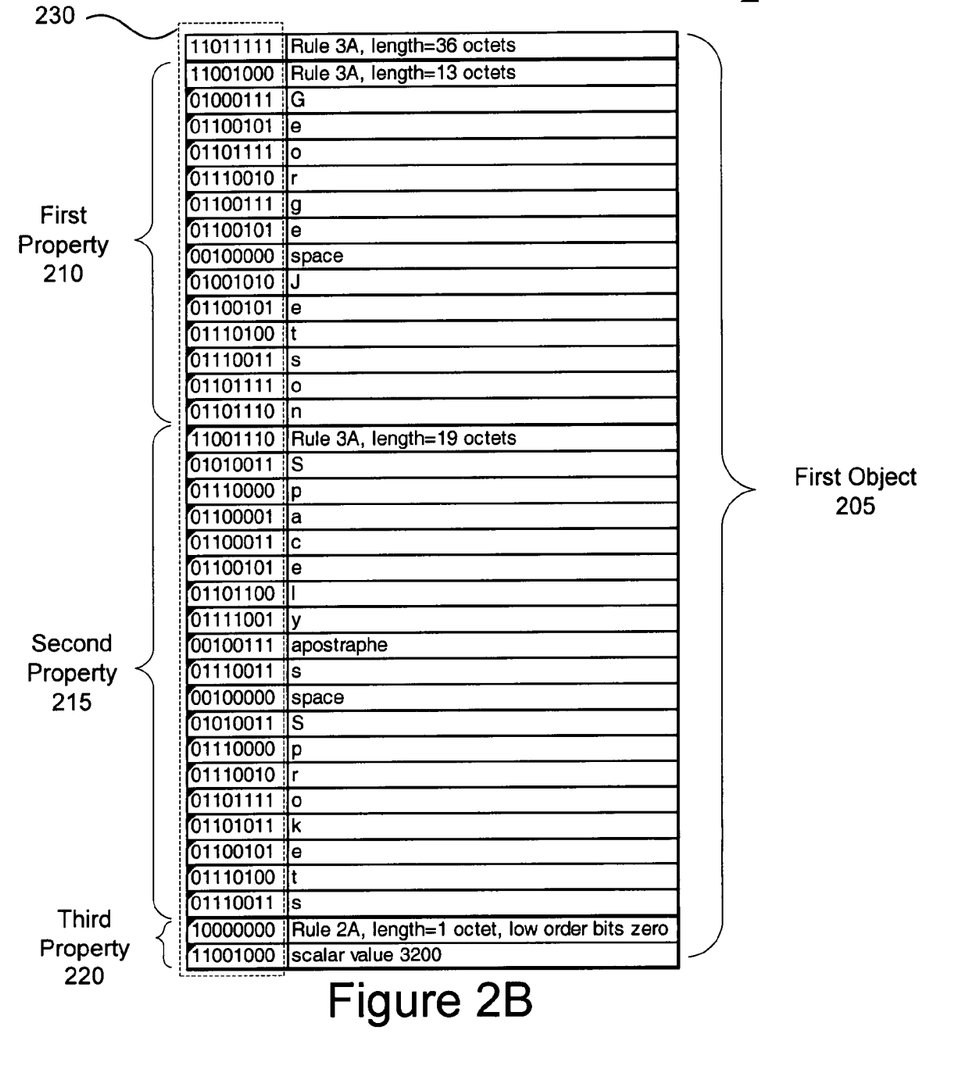
FIG. 2B illustrates an encoding diagram, in accordance with one embodiment of the present invention.

To send data 200 in a manner that preserves first object 205, first object 205 may be serialized during an encoding process. Serializing an object includes converting an object into a byte stream that can be converted back into a copy of that object. In one embodiment, the first object 205 is serialized by arranging the first property, second property and third property in a canonical order in a sequence agreed upon by a sender and recipient. Such an arrangement is illustrated in FIG. 2B. The sender and recipient may agree, for example, that at a particular point in a sequence, an ASCII string should be expected, or an integer should be expected, or a more complicated object should be expected, etc. For example, a sender and recipient of data 200 may agree that data 200 will include a first object 205 that includes first through third properties, with the first property 210 representing an employee name, the second property 215 representing an employer name, and the third property 220 representing a salary. The sender and recipient may further agree that the first property 210 and second property 215 will include an ASCII string, and that the third property 220 will include a scalar. This provides a compact encoding form since no key information (identifying what the data in an object or property represents) or type information (defining how to interpret an encoded object or property) is included in the sequence.

Figure 2C:
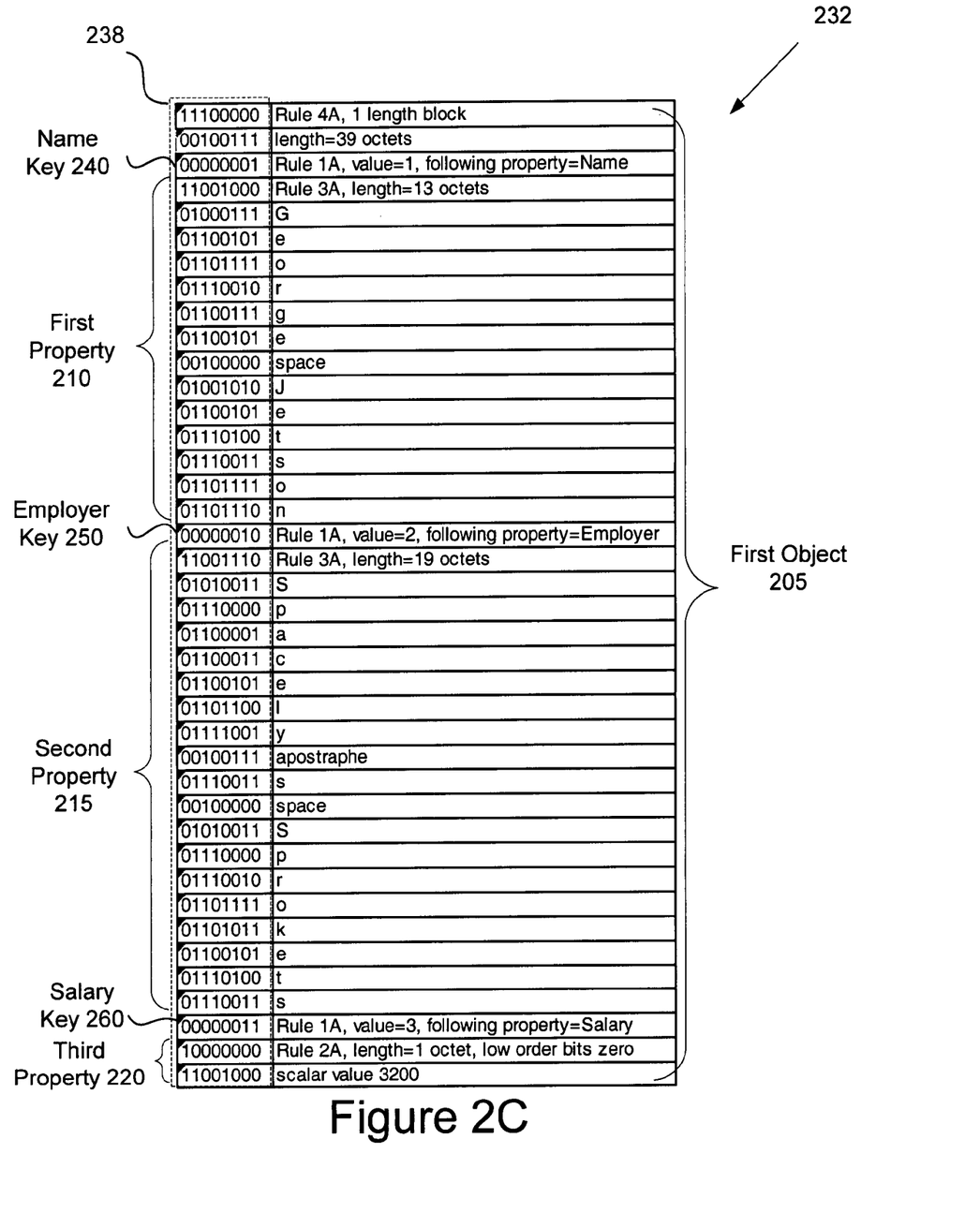
FIG. 2C illustrates an encoding diagram, in accordance with another embodiment of the present invention.

In another embodiment, properties of the first object 205 may be defined in the sequence by key-value pairs, as illustrated in FIG. 2C. A key-value pair associates an object and/or property with specified key information. The use of key-value pairs may enable a sender to send properties in an arbitrary order. For example, rather than agreeing that the first property 210 is sent first, the first property 210 may be sent second, last, etc. This allows for greater flexibility in encoding and transmitting data 200. However, a sender and recipient may still need to agree upon a type for each property.

Figure 2D:
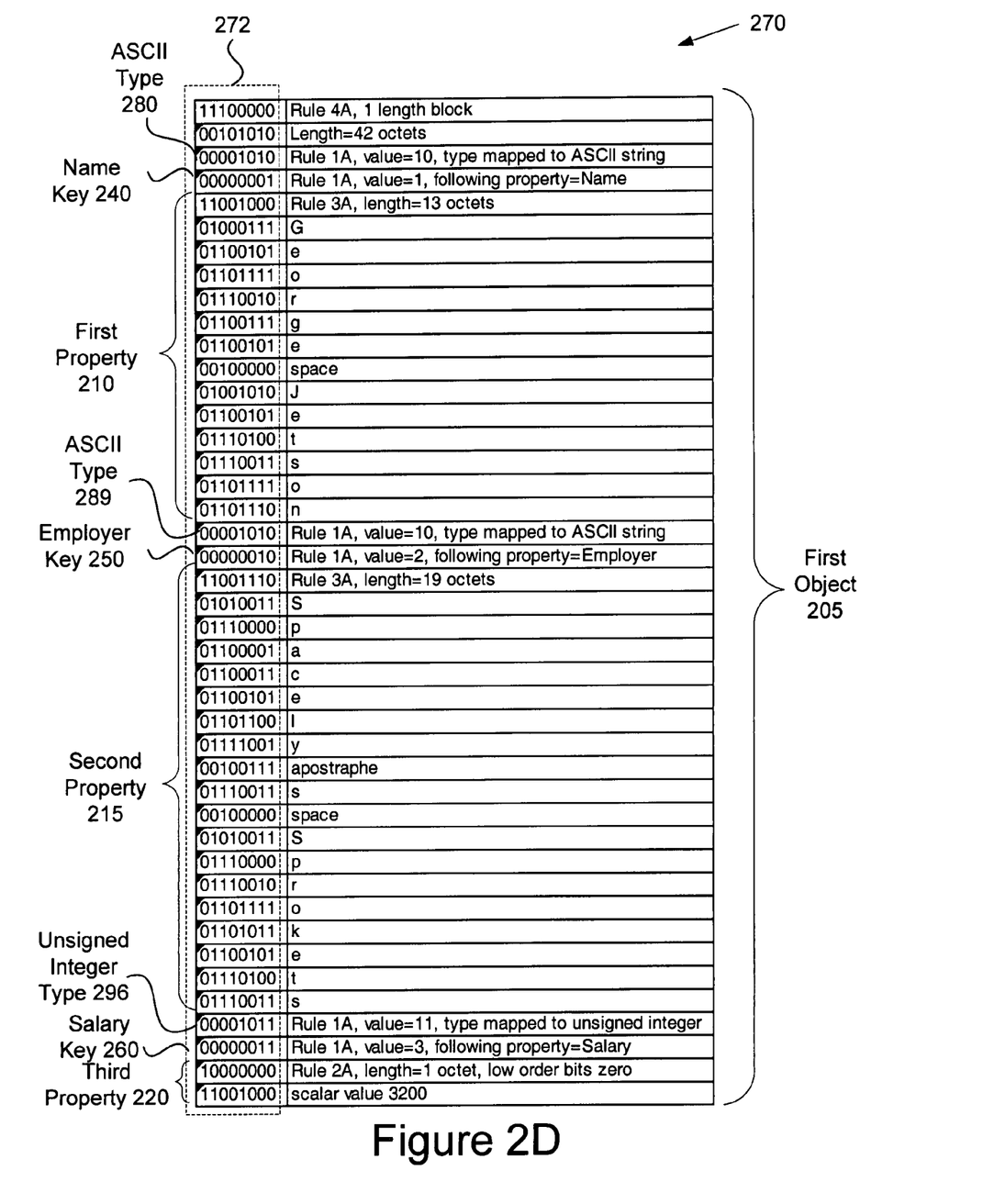
FIG. 2D illustrates an encoding diagram, in accordance with yet another embodiment of the present invention.

In yet another embodiment, properties and/or objects may be sent as key-type-value triplets, as illustrated in FIG. 2D. A key-type-value triplet associates an object and/or property with both a key and a type. Use of key-type-value triplets provides the advantages of key-value pairs, and also identifies type information for each property. Thereby, a sender and recipient do not need to agree upon a predefined arrangement of objects, the arrangement of properties within the objects, the type to associate with objects and/or properties, etc.

Type may be represented as a small integer encoding using rule 1A. For example, the type "null" may be represented as the integer value "0," the type "ASCII character string" may be represented as the integer value "1," and so on. Thereby, when an octet encoded using rule 1A appears before an object or property in a sequence, and the content information of the octet has the value 1, for example, this indicates that the following object or property is an encoded ASCII character string.

In still another embodiment, properties and/or objects may be sent as type-value pairs. A type-value pair associates a type with an object and/or property. This may be useful, for example, where properties and/or objects may be represented in any one of several types.

FIG. 2B illustrates an exemplary encoding diagram 225, in accordance with one embodiment of the present invention. The encoding diagram 225 includes a sequence 230 of octets that encode data 200 of FIG. 2A, and serialize first object 205 without type or key information. In one embodiment, data 200 is encoded into the sequence 230 of octets using the set of rules 150 of FIG. 1B. In a further embodiment, the set of rules 150 are used by encoder/decoder 120 of FIG. 1A to encode data 200.

Referring to FIG. 2B, a first octet in the sequence 230 has a value of 11011111. The three highest order bits "110" of the first octet identify that rule 3A has been used to encode first object 205. The remaining bits of the first octet "11111" identify that the first object 205 includes thirty six data blocks.

A second octet in the sequence 230 has a value of 11001000. The three highest order bits "110" of the second octet identify that rule 3A has been used to encode first property 210. The remaining bits of the second octet "01000" identify that the first property 210 includes thirteen data blocks. It should be noted that the second octet and all subsequent octets in the sequence 230 are data blocks from the point of view of a first encoding (encoding of first object 205). However, from the point of view of a second encoding (encoding of first property 210), the second octet in the sequence 230 is a length block, and the subsequent thirteen octets are data blocks.

The third through the fifteenth octets in the sequence 230 are each data blocks that encode a single ASCII character. However, no type information (information used to interpret what is contained in an object) or keying information (information on what the encoded data represents) is included in the sequence 230. What particular data represents inside the encoding may not be specified by the encoding rules, and may not be self describing. Therefore, in one embodiment, an understanding should exist between an encoder and a decoder (e.g., a sender and recipient) of the sequence 230 as to the type information, the arrangement of objects and/or the properties of objects before data 200 is encoded and/or transmitted.

A sixteenth octet in the sequence 230 has a value of 11001110. The three highest order bits "110" of the sixteenth octet identify that rule 3A has been used to encode second property 215. The remaining bits of the sixteenth octet "01110" identify that the second property 215 includes nineteen data blocks. The seventeenth through the thirty fifth octets in the sequence 230 are each data blocks that encode a single ASCII character.

A thirty sixth octet in the sequence 230 has a value of 10000000. The two highest order bits "10" of the thirty sixth octet identify that rule 2A has been used to encode third property 220. The subsequent two bits "00" in the thirty sixth octet indicate that one additional data block includes content information. The remaining bits of the thirty sixth octet "0000" identify that the low order bits of the content information are all zero. The thirty seventh octet and the four lowest order bits of the thirty sixth octet together indicate a scalar value of 3200.

FIG. 2C illustrates an exemplary encoding diagram 232, in accordance with another embodiment of the present invention. The encoding diagram 232 includes a sequence 238 of octets that encode data 200 of FIG. 2A, and serialize first object 205 using key-value pairs. In one embodiment, data 200 is encoded into the sequence 238 of octets using the set of rules 150 of FIG. 1B. In a further embodiment, the set of rules 150 are used by encoder/decoder 120 of FIG. 1A to encode data 200.

In the sequence 238, a key-value setup is shown. Using the key-value setup, each object and/or property may be preceded by a key. The key may identify what the data in the subsequent object and/or property represents. For example, the key may indicate that a following property represents a name, an employer, a salary, etc.

Referring to FIG. 2C, a first octet in the sequence 238 has a value of 11100000. The four highest order bits "1110" of the first octet identify that rule 4A has been used to encode first object 205. The remaining bits of the first octet "0000" identify that one additional length block is used to indicate the number of data blocks in first object 205. A second octet in the sequence 238 has a value of 00100111, indicating that the first object includes thirty nine data blocks.

A third octet in the sequence 238 has a value of 00000001. The highest order bit "0" of the third octet identifies that rule 1A has been used to encode an integer. The remaining bits "0000001" indicate that the encoded integer has a value of one. The encoded value of one may be mapped to a name key 240. Therefore, when an encoded value of one appears in the sequence 238, a following object and/or property may be understood by a recipient to include data representing a name. Accordingly, first property 210 is keyed to data representing a name. First property 210 includes the fourth octet through the seventeenth octet in the sequence 238.

An eighteenth octet in the sequence 238 has a value of 00000010. The highest order bit "0" of the eighteenth octet identifies that rule 1A has been used to encode an integer. The remaining bits "0000010" indicate that the encoded integer has a value of two. The encoded value of two may be mapped to an employer key 250. Therefore, when an encoded value of two appears in the sequence 238, a following object and/or property may be understood by a recipient to include data representing an employer name. Accordingly, second property 215 is keyed to data representing an employer. Second property 215 includes the nineteenth octet through the thirty seventh octet in the sequence 238.

A thirty eighth octet in the sequence 238 has a value of 00000011. The highest order bit "0" of the thirty eighth octet identifies that rule 1A has been used to encode an integer. The remaining bits "0000011" indicate that the encoded integer has a value of three. The encoded value of three may be mapped to a salary key 260. Therefore, when an encoded value of three appears in the sequence 238, a following object and/or property may be understood by a recipient to include data representing a salary. Accordingly, third property 220 is keyed to data representing a salary. Third property 220 includes the thirty ninth octet through the fortieth octet in the sequence 238.

FIG. 2D illustrates an exemplary encoding diagram 270, in accordance with yet another embodiment of the present invention. The encoding diagram 270 includes a sequence 272 of octets that encode data 200 of FIG. 2A, and serialize first object 205 using key-type-value triplets. In one embodiment, data 200 is encoded into the sequence 272 of octets using the set of rules 150 described with reference to FIG. 1B. In a further embodiment, the set of rules 150 are used by encoder/decoder 120 of FIG. 1A to encode data 200.

In the sequence 272, a self descriptive format has been implemented. Specifically, the sequence 272 is constructed such that type information and key information may precede each object and/or property. The type information (known as a type tag) describes how to interpret the following object and/or property.

Referring to FIG. 2D, a first octet in the sequence 272 has a value of 11100000. The four highest order bits "1110" of the first octet identify that rule 4A has been used to encode first object 205. The remaining bits of the first octet "0000" identify that one additional length block is used to indicate the number of data blocks in first object 205. A second octet in the sequence 272 has a value of 00101010, indicating that the first object includes forty two data blocks.

A third octet in the sequence 272 has a value of 00001010. The highest order bit "0" of the third octet identifies that rule 1A has been used to encode an integer. The remaining bits "0001010" indicate that the encoded integer has a value of ten. The encoded value of ten may be mapped to an ASCII string type 280. Therefore, when an encoded value of ten appears in the sequence 272, a following object and/or property may be understood by a recipient to include data that has been encoded using an ASCII encoding. Accordingly, first property 210 includes ASCII characters. The fourth octet in the sequence 272 maps the first property 210 to data representing a name. First property 210 includes the fifth octet through the eighteenth octet in the sequence 272.

A nineteenth octet in the sequence 272 has a value of 00001010, indicating that the second property 215 includes data that has been encoded using an ASCII encoding. The twentieth octet in the sequence 272 maps the second property 215 to data representing an employer. Second property 215 includes the twenty first octet through the thirty ninth octet in the sequence 272.

A fortieth octet in the sequence 272 has a value of 00001011. The highest order bit "0" of the fortieth octet identifies that rule 1A has been used to encode an integer. The remaining bits "0001011" indicate that the encoded integer has a value of eleven. The encoded value of eleven may be mapped to an unsigned integer type 280. Therefore, when an encoded value of eleven appears in the sequence 272, a following object and/or property may be understood by a recipient to include an unsigned integer that has been encoded into binary format. Accordingly, third property 220 includes an unsigned integer. The forty first octet in the sequence 272 maps the third property 220 to data representing a salary. Third property 220 includes the forty second octet through the forty third octet in the sequence 272.

Figure 3:
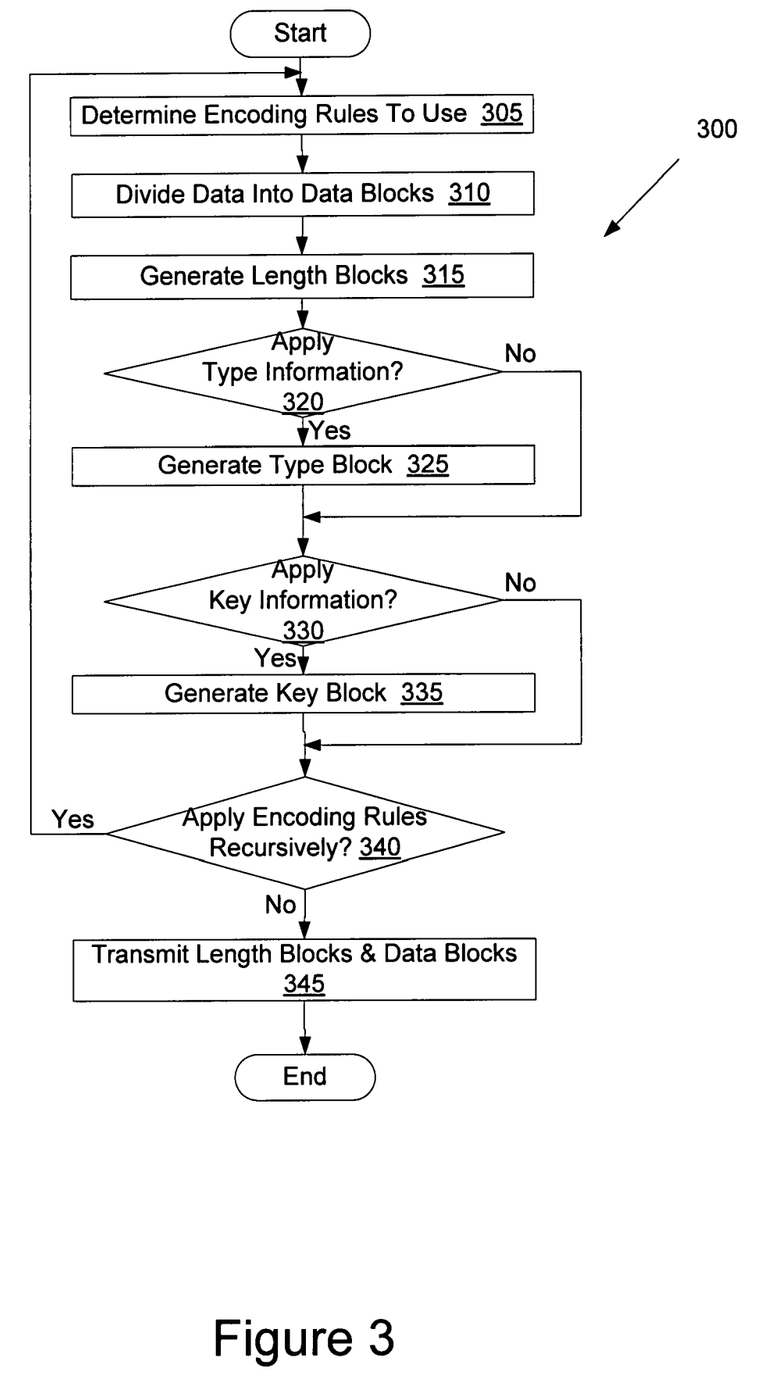
FIG. 3 illustrates a flow diagram of one embodiment for a method of encoding data.

FIG. 3 illustrates a flow diagram of one embodiment for a method 300 of encoding data. The method may be performed by processing logic that may comprise hardware (e.g., circuitry, dedicated logic, programmable logic, microcode, etc.), software (such as instructions run on a processing device), or a combination thereof. In one embodiment, method 300 is performed by encoder/decoder 120 of FIG. 1A.

Referring to FIG. 3, method 300 begins with determining which encoding rule or rules to use (block 305). In one embodiment, the encoding rules correspond to the set of encoding rules 150 of FIG. 1B. Alternatively, different encoding rules may be used.

At block 310, data is divided into data blocks. The number of bits in each data block may depend on the set of encoding rules. In one embodiment, the data blocks each include 8 bits. Alternatively, the data blocks may each include 5 bits, 10 bits, 16 bits, etc. At block 315, length blocks are generated. The highest one or more bits in a first length block may identify which encoding rule was used to encode the data (e.g., to divide the data into data blocks and generate length blocks). The remaining bits in the first length block and the subsequent length blocks may indicate a number of data blocks into which the data has been divided.

At block 320, processing logic determines whether type information should be applied to the encoded data blocks and/or length blocks. If type information is to be added, the method proceeds to block 325, and a type block is generated. A type block may be encoded using one of the encoding rules. Different types may include a null type, a Boolean type, an unsigned integer type, an ISO 8859-1 (latin-1) character string type, a UTF8 character string type, an aggregate type (e.g., from an embedded object), one or more reserved types, one or more implementation specific types, etc. Each type may be mapped to a specified numeric value that may be agreed upon by a sender and recipient. Therefore, if a sequence of blocks includes an encoded numeric value that has been mapped to type, a following property or object may be associated to that type. If no type information is to be added, the method proceeds to block 330.

At block 330, processing logic determines whether to add keying information (or key information) to the data blocks and/or length blocks. In one embodiment, keying information is mapped to specific encoded numeric values. Alternatively, keying information may be specifically defined before an object or property. For example, a textual representation of "name" may be encoded before a property, thus associating the property with a name. Therefore, any value encoded into the property may be understood to represent a specific name. If keying information is to be added, the method proceeds to block 335, and a key block is generated. A key block may be encoded using one of the encoding rules. If no keying information is to be added, the method proceeds to block 340.

At block 340, processing logic determines whether the encoding rules should be applied recursively. Encoding rules may be applied recursively, for example, if complex data structures (e.g., an object with multiple properties, or an embedded object) are to be encoded. Applying the encoding rules recursively may allow for encoded objects to be nested within other encoded objects. If the encoding rules are to be applied recursively, the method proceeds to block 305. Otherwise, the method proceeds to block 345.

At block 345, the length blocks and data blocks are transmitted. If type blocks and/or key blocks were created, the type blocks and key blocks may also be transmitted. The method then ends.

Figure 4:
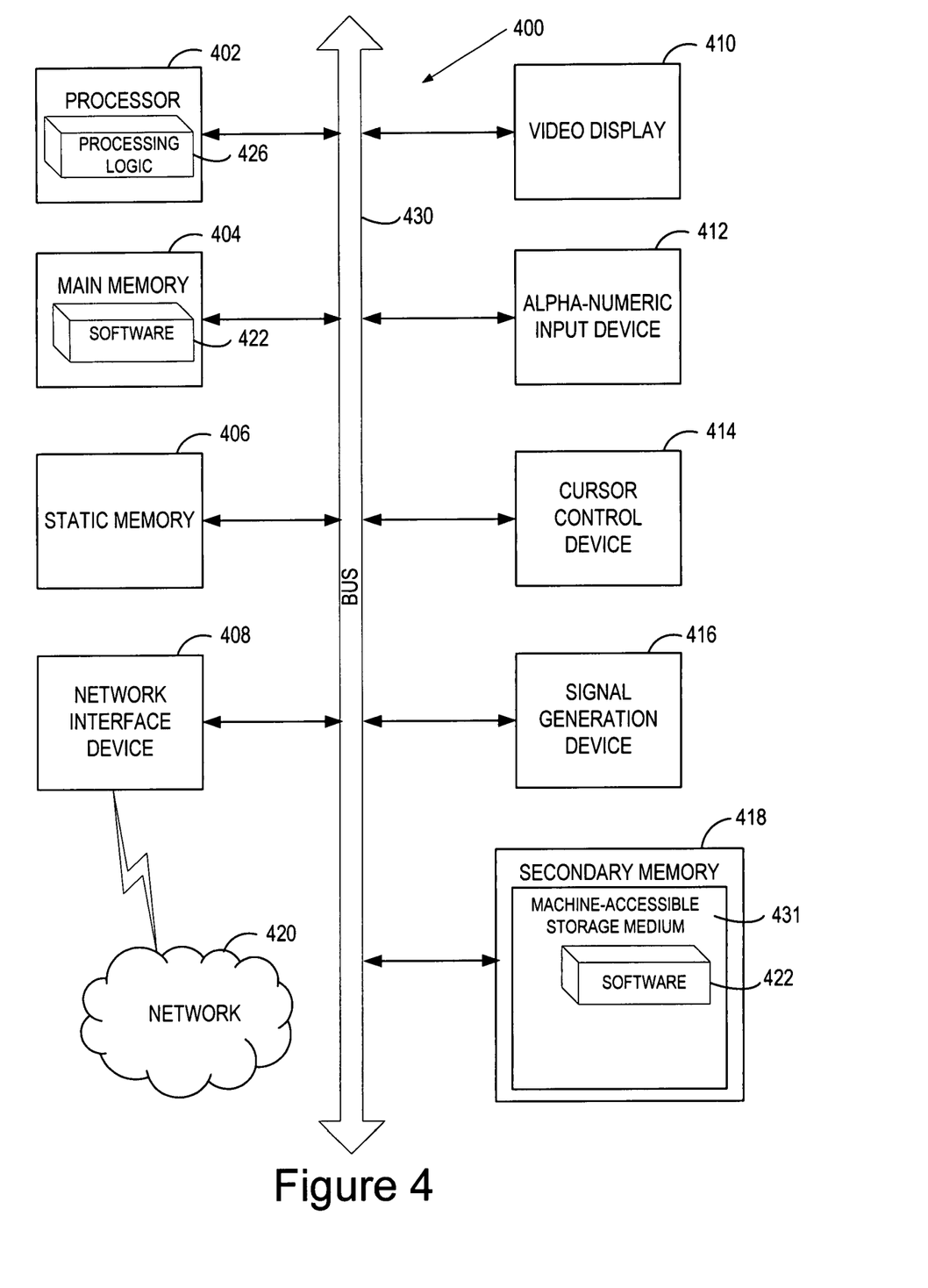
FIG. 4 illustrates a diagrammatic representation of a machine in the exemplary form of a computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 431 on which is stored one or more sets of instructions (e.g., software 422) embodying any one or more of the methodologies or functions described herein. The software 422 may also reside, completely or at least partially, within the main memory 404 and/or within the processor 402 during execution thereof by the computer system 400, the main memory 404 and the processor 402 also constituting machine-accessible storage media. The software 422 may further be transmitted or received over a network 420 via the network interface device 408.

The machine-accessible storage medium 431 may also be used to store data structure sets that define user identifying states and user preferences that define user profiles. Data structure sets and user profiles may also be stored in other sections of computer system 400, such as static memory 406.

While the machine-accessible storage medium 431 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any physical medium that is capable of storing, encoding or carrying a set of instructions for execution by the machine and that cause the machine to perform any one or more methodologies of the present invention. The term "machine-accessible storage medium" shall accordingly be taken to include, but not be limited to, solid-state memories and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method of encoding data, comprising:
    dividing data of arbitrary size into one or more data blocks by a processing device executing an encoder;
    generating, by the processing device, one or more length blocks that include length information identifying a quantity of the one or more data blocks into which the data is divided, wherein the length blocks are generated using one or more encoding rules that control at least one of how many length blocks to generate or contents of the one or more length blocks based at least in part on the quantity of the one or more data blocks, wherein the length information is determinable by a number of reads of the length blocks and without examining data blocks that do not include length information; and
    transmitting the length blocks and the data blocks to a recipient.

2. The computer implemented method of claim 1, wherein the number of reads includes at most three reads for non-recursive encodings.

3. The computer implemented method of claim 1, wherein the one or more data blocks have a predetermined size, and the one or more length blocks have the predetermined size.

4. The computer implemented method of claim 1, wherein the data is an integer.

5. The computer implemented method of claim 1 wherein the method of encoding the data is non-recursive, the method further comprising:
    performing at most three reads on the length blocks to determine the quantity of the one or more data blocks; and
    combining the data blocks to reconstruct the data.

6. The computer implemented method of claim 1, wherein at least one of the one or more data blocks is also a length block.

7. The computer implemented method of claim 1, wherein the dividing and the generating are performed according to the one or more encoding rules, further comprising:
    applying the one or more encoding rules recursively to encode an arbitrarily complex data structure.

8. A non-transitory machine-accessible storage medium including instructions that, when executed by a machine, cause the machine to perform a computer implemented method of encoding data comprising:
    dividing data of arbitrary size into one or more data blocks by a processing device executing an encoder;
    generating, by the processing device, one or more length blocks that include length information identifying a quantity of the one or more data blocks into which the data is divided, wherein the length blocks are generated using one or more encoding rules that control at least one of how many length blocks to generate or contents of the one or more length blocks based at least in part on the quantity of the one or more data blocks, wherein the length information is determinable can be determined by a number of reads of the length blocks and without examining data blocks that do not include length information; and
    transmitting the length blocks and the data blocks to a recipient.

9. The non-transitory machine-accessible storage medium of claim 8, wherein the number of reads includes at most three reads for non-recursive encodings.

10. The non-transitory machine-accessible storage medium of claim 8, wherein the one or more data blocks have a predetermined size, and the one or more length blocks have the predetermined size.

11. The non-transitory machine-accessible storage medium of claim 8, wherein the data is an integer.

12. The non-transitory machine-accessible storage medium of claim 8 wherein the method of encoding the data is non-recursive, the method further comprising:
    performing at most three reads on the length blocks to determine the quantity of the one or more data blocks; and
    combining the data blocks to reconstruct the data.

13. The non-transitory machine-accessible storage medium of claim 8, wherein at least one of the one or more data blocks is also a length block.

14. The non-transitory machine-accessible storage medium of claim 8, wherein the dividing and the generating are performed according to the one or more encoding rules, the method further comprising:
    applying the one or more encoding rules recursively to encode an arbitrarily complex data structure.

15. A computing apparatus, comprising:

an encoder to divide data of arbitrary size into one or more data blocks, and to generate one or more length blocks that include length information identifying a quantity of the one or more data blocks into which the data is divided, wherein the length blocks are generated using one or more encoding rules that control at least one of how many length blocks to generate or contents of the one or more length blocks based at least in part on the quantity of the one or more data blocks, wherein the length information is determinable by a number of reads of the length blocks and without examining the data blocks; and an input/output unit, coupled with the encoder, to transmit the length blocks and the data blocks to a recipient.

16. The computing apparatus of claim 15, wherein the number of reads includes at most three reads for non-recursive encodings.

17. The computing apparatus of claim 15, wherein the one or more data blocks have a predetermined size, and the one or more length blocks have the predetermined size.

18. The computing apparatus of claim 15, further comprising:

a decoder coupled with the input/output unit to receive the length blocks and the data blocks, to perform a number of reads on the length blocks to determine the quantity of the one or more data blocks, and to combine the data blocks to reconstruct the data.

19. The computing apparatus of claim 15, wherein at least one of the one or more data blocks is also a length block.

20. The computing apparatus of claim 15, wherein the encoder divides the data blocks and the generates the length blocks according to the one or more encoding rules, and wherein the encoder applies the one or more encoding rules recursively to encode an arbitrarily complex data structure.

* * * * *